United States Patent
Wilhelm

(10) Patent No.: US 11,638,418 B1
(45) Date of Patent: *May 2, 2023

(54) ADJUSTABLE ROTATIONAL FLASHER

(71) Applicant: Leo M. Wilhelm, Umatilla, OR (US)

(72) Inventor: Leo M. Wilhelm, Umatilla, OR (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/111,399

(22) Filed: Dec. 3, 2020

(51) Int. Cl.
| | | |
|---|---|---|
| *A01K 85/00* | (2006.01) | |
| *A01K 85/12* | (2006.01) | |
| *A01K 91/08* | (2006.01) | |
| *A01K 85/01* | (2006.01) | |

(52) U.S. Cl.
CPC .......... *A01K 85/125* (2022.02); *A01K 85/012* (2022.02); *A01K 91/08* (2013.01)

(58) Field of Classification Search
CPC .... A01K 91/08; A01K 85/012; A01K 85/125; A01K 85/005; A01K 85/011
See application file for complete search history.

(56) References Cited

U.S. PATENT DOCUMENTS

| | | | |
|---|---|---|---|
| 1,333,154 A | | 3/1920 | Buddle |
| 1,450,798 A | * | 4/1923 | Filipowski .............. A01K 85/12 43/42.46 |
| 1,769,083 A | * | 7/1930 | Tozier .................... A01K 85/12 43/42.51 |
| 1,804,391 A | | 5/1931 | Abrahams |
| 2,235,905 A | | 3/1941 | Sherwood |
| 2,608,788 A | | 9/1952 | Niemi |
| 2,705,848 A | | 4/1955 | Stettner |
| 2,891,344 A | | 6/1959 | Hottowe |
| 2,926,451 A | * | 3/1960 | Leba ...................... A01K 85/12 43/42.17 |
| 2,952,936 A | * | 9/1960 | White .................... A01K 85/12 D22/129 |
| 3,056,228 A | | 10/1962 | Stackhouse |
| 3,432,957 A | | 3/1969 | Marino |
| 3,673,727 A | | 7/1972 | Eddie |
| 3,735,522 A | | 5/1973 | Thomas |
| 4,237,644 A | | 12/1980 | Hansen |
| 4,819,362 A | | 4/1989 | Lewis |
| D363,113 S | | 10/1995 | Hazelquist |
| 5,970,648 A | | 10/1999 | DeRose |

(Continued)

OTHER PUBLICATIONS

Church Tackle—Manufacturer of High Performance Planer Boards and Trolling Accessories—Revelator Flashers, Jan. 13, 2015, 4 pages, https://www.churchtackle.com/product%20pages/Revelators.html.

*Primary Examiner* — Yvonne R Abbott-Lewis
(74) *Attorney, Agent, or Firm* — Dwayne E Rogge

(57) ABSTRACT

Disclosed herein is a fishing flasher device which is configured to be attached to a main fishing line to be drawn through the water, generally by trolling behind a slowly moving water vessel. The flasher device has an on-axis mainline attachment on the forward end to produce a spinning or rotational movement about the axis of the mainline. The flasher device also has at least two off-axis mainline attachments at varied lateral offsets from the longitudinal axis at the forward end of the flasher. The off-axis attachments configured to produce an orbiting motion rather than a rotational movement of the flasher device. A trailing line is generally attached to a trailing line attachment point on the rearward end of the flasher device to which is connected lures, bait, hooks, etc. for catching fish.

12 Claims, 4 Drawing Sheets

(56) References Cited

U.S. PATENT DOCUMENTS

| | | | |
|---|---|---|---|
| 5,987,805 A | 11/1999 | Laney | |
| 6,108,964 A | 8/2000 | Noorlander | |
| 6,643,975 B1 | 11/2003 | Edwards | |
| D483,835 S | 12/2003 | Nichols | |
| D495,396 S | 8/2004 | Yamaguchi | |
| D637,685 S | 5/2011 | Pruitt | |
| D678,460 S | 3/2013 | Pool | |
| 9,717,223 B1 | 8/2017 | Wilhelm | |
| D823,983 S | 7/2018 | Wilhelm | |
| 2005/0028423 A1 | 2/2005 | Kaariainen et al. | |
| 2005/0229473 A1* | 10/2005 | Altman | A01K 85/12 43/42.11 |
| 2010/0071251 A1 | 3/2010 | Kaariainen | |
| 2010/0263258 A1* | 10/2010 | Hinz | A01K 85/12 43/42.13 |
| 2011/0197492 A1* | 8/2011 | Fowler | A01K 91/08 43/4.5 |
| 2012/0285073 A1 | 11/2012 | Ott | |
| 2013/0239458 A1* | 9/2013 | Hallan | A01K 85/12 43/42.2 |
| 2013/0276349 A1* | 10/2013 | Tigner | A01K 85/01 43/42.19 |
| 2014/0283434 A1* | 9/2014 | Teegarden | A01K 85/10 43/42.19 |

* cited by examiner

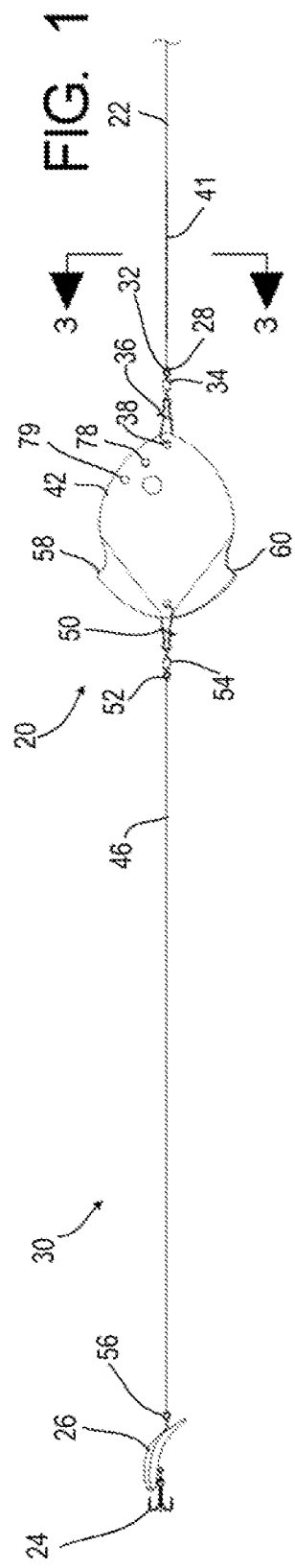
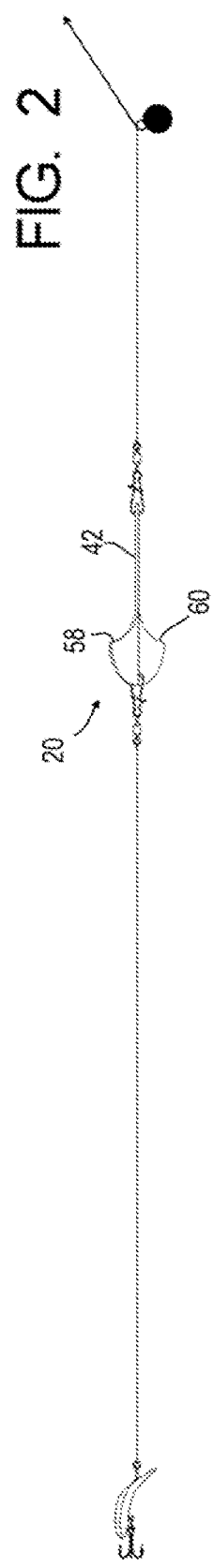
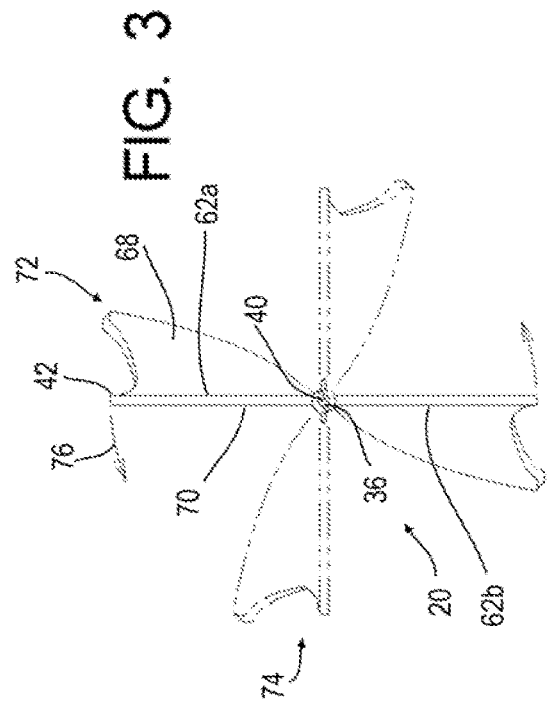

ADJUSTABLE ROTATIONAL FLASHER

FIELD OF THE DISCLOSURE

This disclosure relates to the field of line fishing devices configured to visually and vibrationally attract fish to a hook not directly attached to the adjustable rotational flasher.

SUMMARY OF THE DISCLOSURE

Disclosed herein is an adjustable fishing flasher device having a substantially planar main body having opposing transverse sides. In one example the main body is substantially rotationally symmetric about a longitudinal axis; the main body having a forward end and a rearward end; an on-axis main line attachment at the forward end of the main body on the longitudinal axis; at least two off-axis main line attachments at the forward end of the main body, each laterally offset from the lateral axis a different distance; a trailing line attachment at the rearward end of the main body on the lateral axis; a fin fold line in the plane of the main body at a fin axis angle to the longitudinal axis on each lateral side of the longitudinal axis; a plurality of fins each extending from the main body along a fin fold line at a fin fold angle such that each fin is not coplanar with (extends at an angle with respect to) the main body; and at least one transverse side of the main body having a highly reflective surface thereon.

The fishing flasher device may further include a surface defining a hanging hole through the main body longitudinally rearward of the on-axis main line attachment.

The fishing flasher device may be arranged wherein the fin fold angle is between 40 and 55 degrees. In a narrower range, the fishing flasher device is arranged wherein the fin fold angle is between 40 and 45 degrees.

The fishing flasher device may be arranged wherein the fin fold angle is commensurate (proportionate) with the longitudinal length of the main body along the longitudinal axis.

The fishing flasher device in one example is formed wherein the longitudinal length of the main body is substantially 8⅝" (21.91 cm) and the fin fold angle is substantially 44 degrees.

The fishing flasher device in another example is formed wherein the longitudinal length of the main body is substantially 7¾" (19.69 cm) and the fin fold angle is substantially 41 degrees.

The fishing flasher device in another example is formed wherein the longitudinal length of the main body is substantially 6⁵⁄₁₆" (16.03 cm) and the fin fold angle is substantially 40 degrees.

The fishing flasher device in another example is formed wherein the longitudinal length of the main body is substantially 5" (12.70 cm) and the fin fold angle is substantially 55 degrees.

The fishing flasher device may be arranged wherein each transverse side of the main body has a highly reflective surface thereon.

BRIEF DESCRIPTION OF THE DRAWINGS

FIG. 1 is a side environmental view of one example of the apparatus in use in a rotating configuration.

FIG. 2 is a top environmental view of the apparatus shown in FIG. 1 in the rotating configuration.

FIG. 3 is a front end view of the apparatus shown in FIG. 1 in use in the rotating configuration.

DESCRIPTION OF THE PREFERRED EMBODIMENTS

Figure 4:
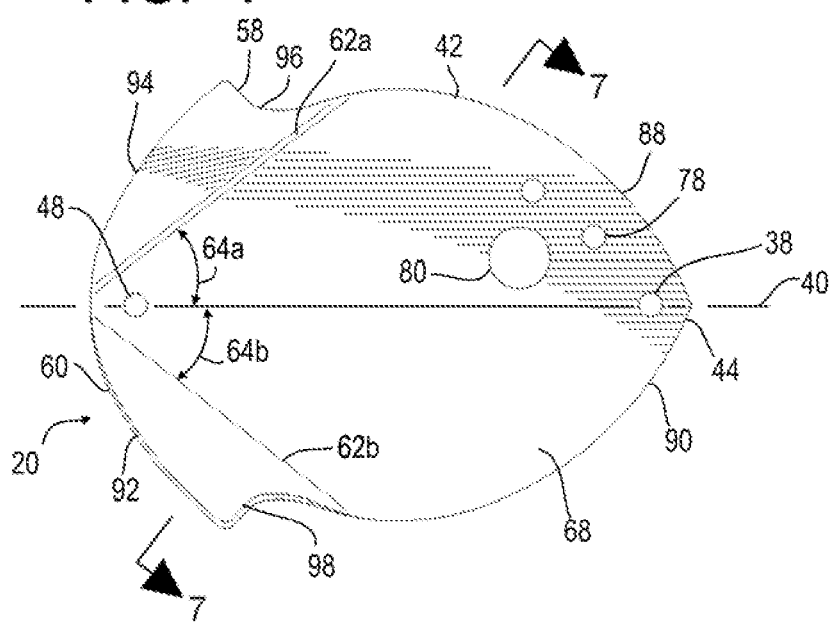
FIG. 4 is a side view of the apparatus shown in FIG. 1.

In the sport, hobby, research, and commercial practice of fishing with at least one hook and line, it has been found beneficial to use visual, scent, and/or vibrational attractants to attract a fish towards the hook. Once attracted towards the hook, the fish is more likely to bite the hook. The hook and fish may then be retrieved for food, research, or sport. It is known that some fish species are more attracted to visual or vibrational attractants, while other species are more attracted to scent attractants. The present disclosure is of particular significance when used as a visual and/or vibrational attractant while fishing, and the present disclosure will be described herein in the context of attracting fish for food, research, and/or sport.

Visual/vibrational attractants used while fishing are often called "flashers" due to the visual nature they present when pulled through the water behind a water vessel (boat) as the flashers reflect sunlight during rotation, rotationally oscilate, or orbit about a mainline, and longitudinally oscilate (thump). One such fishing flasher device 20 is shown in the drawings of this disclosure with an adjustable arrangement where the orbital radius and longitudinal oscilation may be adjusted. Pulling of such fishing gear through the water is generally done at slow speeds between 2 mph and 5 mph from a water vessel (boat) (not shown) and is called "trolling."

In the art of line fishing, as shown in FIG. 1 a mainline 22 having a first end attached to a rod and reel (not shown), spool, or equivalent device and a second end removably attached to the flasher device 20. As the vessel moves during trolling, the main line 22 is under tension such that forward movement of the vessel through the water pulls the flasher device 20 through the water. As is conventional, the reel spool, or equivalent device also allows for the mainline length from the reel to the hook 24 or flasher 20 to be adjusted and allows relatively easy retrieval of a hook 24, lure 26, flasher 20, fish, etc. In particular, the distal end 28 of the mainline 22 is attached to gear 30 generally including varying combinations of rigid eyes 32, swivels 34, snap swivels 36, bait, and weights (not shown), in addition to the flasher 20, lure 26, and hook 24. The gear 30 may also include accessories such as scent holders, sonic attractants, and the like.

The example flasher 20 is designed to operate in first, and second flasher modes when pulled through the water during trolling, In the first flasher mode shown in FIG. 3, the flasher 20 simply rotates about its longitudinal axis 40 where the longitudinal axis 40 is substantially aligned with a main pull axis 41 generally defined by a force vector on a portion of the mainline 22 just ahead of the flasher 20. In the second flasher modes shown in FIG. 8, the flasher 20 rotates about its longitudinal axis 40 and simultaneously orbits or revolves about the main pull axis 41 aligned with an orbit centerline 82 generally defined by the direction of travel of the vessel towing the mainline 22. In this configuration, the flasher 20 also thumps, or longitudinally oscillates 104/105. This longitudinal oscilation 104/105 is most noticeable at the fishing pole, where the longitudinal oscilation pulls and releases the fishing pole tip toward the flasher 20. This oscilation 104/105 also similates a wounded or easy to catch fish, increasing the likelihood that a fish will strike or bite the lure 26.

Often, a person fishing will set their boat speed dependent upon the frequency of this longitudinal oscilation. The example flasher 20 is sized, constructed, and dimensioned such that the attachment point at which the mainline 22 is connected to the flasher 20 determines whether the flasher 20 operates in the first flasher mode or the second flasher mode. When used in the second flasher mode, the user may select between a first offset hole 78, a second offset hole 79, or additional offset holes. The second, third, and subsequent offset holes 78, 79 cause the flasher 20 to orbit around an orbit centerline 82. The orbit centerline generally aligned with a portion of the mainline 22 at a point longitudinally forward of the flasher 20. For example, when a downrigger ball is used, for example as shown in U.S. Pat. No. 3,710,501A incorporated herein by reference, the orbit centerline may be aligned with the attachment point of the mainline to the downrigger as shown in FIG. 2.

The example flasher device 20 shown in FIG. 1 and in FIG. 2 comprises a main body 42 with various attachment points and one or more fins extending therefrom. The fishing flasher device 20 of this example is attached to the main line 22 at the snap swivel 36. In this example, the snap swivel 36 is attached to a first, on-axis attachment 38 provided on the longitudinal axis 40 of the main body 42 at a forward end 44. The first, on-axis attachment 38 may be a surface defining a void through the main body.

A trailing line 46 is attached to at least one trailing line attachment 48. The trailing line attachment 48 may be on the longitudinal axis 40 or may be offset therefrom or a combination thereof. This trailing line attachment 48 may be a surface defining a void through the main body. The trailing line 46 may be attached at either end by way of a knot or other methods to a snap swivel 50 which may include an eye 52 and a swivel 54. The trailing line 46 of this example extends rearward to the lure 26, the lure 26 generally having one or more hooks 24 attached thereto.

As shown in FIG. 1, the trailing line 46 may be attached by way of a knot to an eye 56. A swivel and/or snap swivel may be utilized at this attachment between the eye 56 and the lure 26 to reduce twisting of the trailing line 46 and to ease in attachment and removal of the lure 26 from the trailing line 46.

Generally, the mainline 22 will be a very strong line, the strength of this line selected relative to the size of the fish intended to be caught and the drag of the flasher 20, whereas the trailing line 46 may have less tensile strength than the mainline 22. In this way, if and when the hook 24 catches upon a log, seal, another vessel, or other fixed structure, the trailing line 46 will break before the mainline 22, thus allowing salvage of the relatively expensive mainline 22, the flasher 20, and other accessories attached forward of the break. The trailing line 46 may be of a substantially large and stiff material (line) so as to more appropriately and efficiently transfer movement from the flasher 20 to the lure 26 without tangling. The lure 26 as shown is an artificial lure however, bait type lures may also be utilized and combinations of artificial lures and bait may be used with or without scent attractants.

The example flasher 20 as shown comprises a plurality of fins including a first fin 58 and a second fin 60 extending laterally and longitudinally from the axis 40. These fins 58 and 60 may be a homogenous unitary structure to, or integrally formed with the main body 42. The fins 58 and 60 may alternatively be separately formed and attached to the main body 42. The main body 42 and fins 58 and 60 may be made of one or more materials such as polymers, metals etc. The example first and second fins 58 and 60 may be formed by heating the a blank along a first fin fold line 62*a* and a second fin fold line 62*b*, respectively, and then bending the heated blank at first and second fin fold lines 62*a* and 62*b* such that the fins 58 and 60 extend at first and second fin fold angles 66*a* and 66*b* as shown in FIG. 4. The example flasher 20 is constructed such that the first and second fin fold lines 62*a* and 62*b* extend at a first and second fin axis angles 64*a* and 64*b* from the longitudinal axis 40 as shown in FIG. 4. In the example flasher 20, the fin axis angles 64*a* and 64*b* are substantially the same and the fin fold angles 66*a* and 66*b* are substantially the same.

Figure 7:
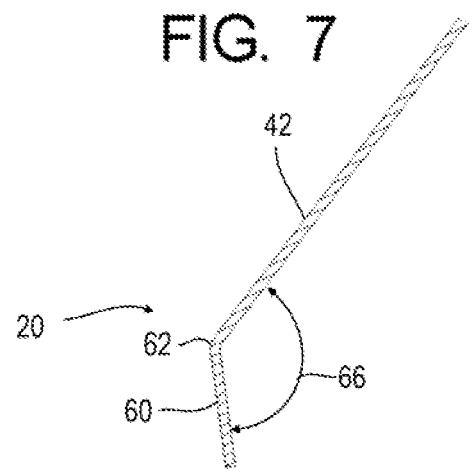
FIG. 7 is a cutaway view taken along line 7-7 of FIG. 4.

Looking to FIG. 7, it can be seen that the fins 58 and 60 are folded or bent along the fin fold line 62 at the fin fold angles 66*a* and 66*b*, respectively. As the fins 58 and 60 are thus folded, hydrodynamic forces acting upon these fins 58 and 60 will cause rotation of the main body 42 around the longitudinal axis 40 when attached in the manner shown in FIGS. 1-3. This rotation speed, and rotational circumference or offset 84, 85 is determined by the speed of the towing vessel through the water, the angle of the fin fold line 62, fin fold angles 66*a*, 66*b*, the relative distance from the longitudinal axis 40 to the main line attachment 78, drag of the attached components, and distance from the leading point (e.g. connection point on downrigger) to the main line attachment 78.

This rotation speed, and rotational circumference or offset 84, 85 is also determined by the position of the offset hole laterally from the longitudinal axis 40, and forward end 44. Thus in the example shown, separate off-axis attachment points 78/79 are provided to adjust the action of the flasher 20. At the same vessel speed, selection of the second offset hole 79 increases longitudinal oscilation 105, and orbit diameter 85 relative to selection of the first offset hole 78. Alternatively, selection of the second offset hole 79 allows the flasher to be pulled at much lower speeds (e.g. from 0.5 to 2 mph) with an equivalent orbital offset 84 and oscilation 104 to a higher speed (e.g. 2 mph to 4 mph).

In the example shown, the main body 42 has alternate or opposing transverse sides 68 and 70. Rotation of the main body 42 and fins 58 and 60 will cause one transverse side and then the other to be facing fish in the vicinity and angled to the sun. This arrangement causes a flashing action when the transverse side of the main body 42 is at the proper angle between the fish and the sun, thus reflecting sunlight towards the fish. In some examples, micro cube corner type reflectors may be utilized to enhance this reflective quality. In some examples, both transverse sides 68 and 70 of the flasher 20 may be partially or fully covered with a reflective surface. These reflective surfaces may be formed by a polished surface of the main body and/or fins or may be painted, adhered, cast etc. onto the main body and/or fins. In some examples an adhesive backed layer having the reflective surface may be applied to the main body and/or fins.

Rotation of the main body 42 may also impart a vibration in the water. Each of the flashing visual cues and the vibration sensory cue may attract fish toward the flasher device 20. Once the fish is relatively close to the flasher device 20 it is intended that the fish see the lure 26 as a possible food source, thus biting the lure 26 and becoming impaled upon the hook 24. The entire assembly (with the fish attached) may then be retrieved by way of the rod and reel previously described.

FIG. 3 shows the flasher 20 in the first flasher mode in which the main body 42 rotates about the longitudinal axis 40 from a first position 72 to a second position 74 in rotational direction of travel 76. This axial rotation continues in this example in a counter-clockwise direction as long as the apparatus is pulled through the water. The fins may be reversed along the fin fold line to impart a clockwise rotation.

Figure 8:
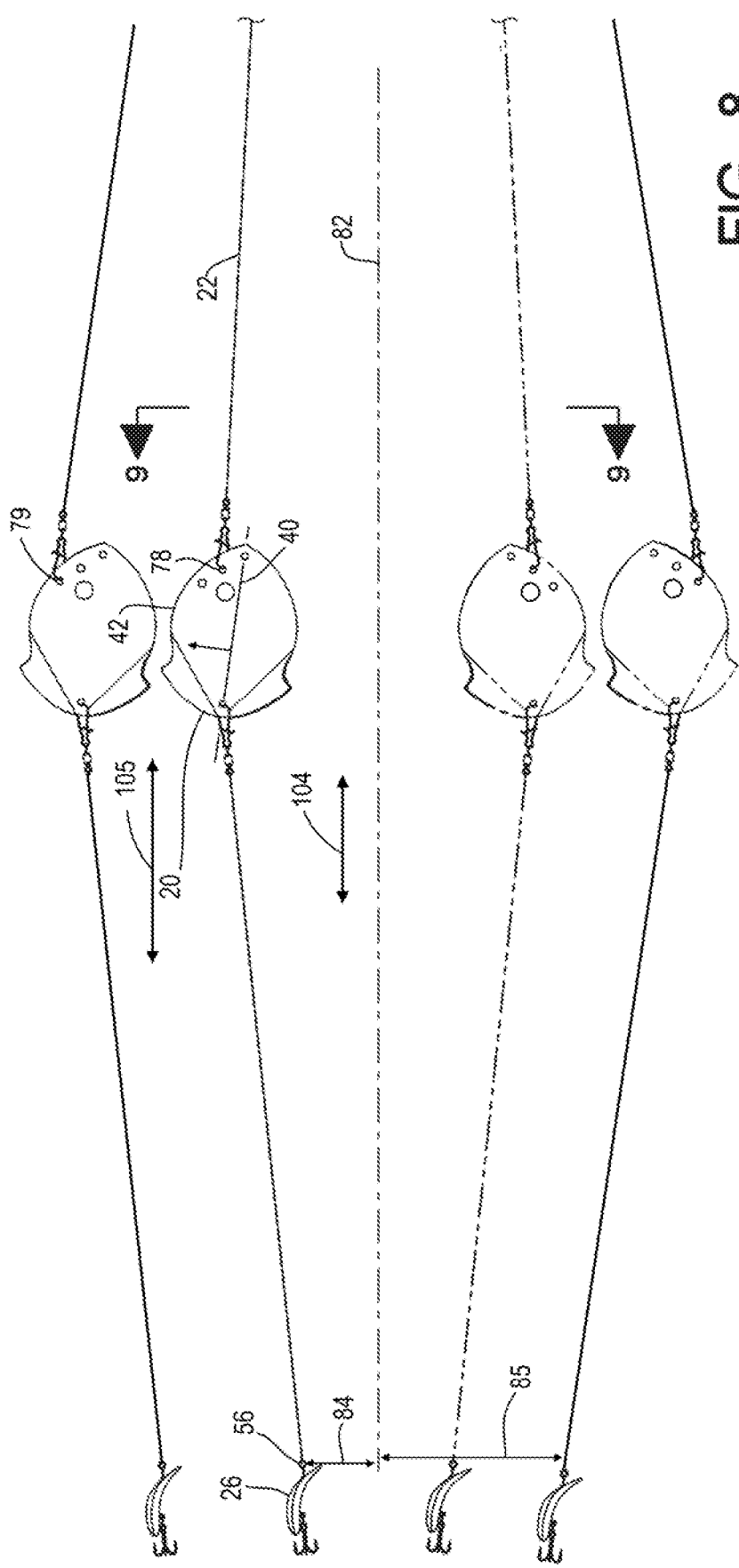
FIG. 8 is an environmental side view of the apparatus shown in FIG. 1 in an orbiting configuration.

Looking to FIG. 8 it is shown that the main line 22 is attached to the main body 42 at a second (78) or third (79), off-axis main line attachment 78 to allow the flasher 20 to operate in the second flasher mode during trolling. The second and third, off-axis main line attachments 78, 79 may be a surface defining a void (hole) through the main body. The off-axis main line attachments 78, 79 are formed in the main body 42 adjacent to the forward end 44 near the first, on-axis main line attachment 38. However, while the first, on-axis main line attachment 38 is formed on the longitudinal axis 40, the off-axis main line attachments 78, 79 are spaced from the longitudinal axis 40 and may be slightly longitudinally rearward of the first off-axis main line attachment 38.

In use in the second flasher mode, attachment of the main line 22 to the off-axis attachments 78, 79 instead of to the on-axis attachment 38 will generally change rotation of the flasher device 20 from that shown in FIG. 3 as the longitudinal axis 40 does not pass through the off-axis attachment 78. As can be appreciated by looking to FIGS. 8 and 9, when arranged in this configuration, the flasher 20 will not only rotate around the longitudinal axis 40 of the flasher 20 but also orbits around the orbit centerline 82 aligned with the main pull axis 41. When a downrigger assembly is used, this orbit centerline 82 may extend longitudinally rearward of a downrigger release such as disclosed in U.S. Pat. No. 4,698,933 and depicted in FIG. 2.

Figure 9:
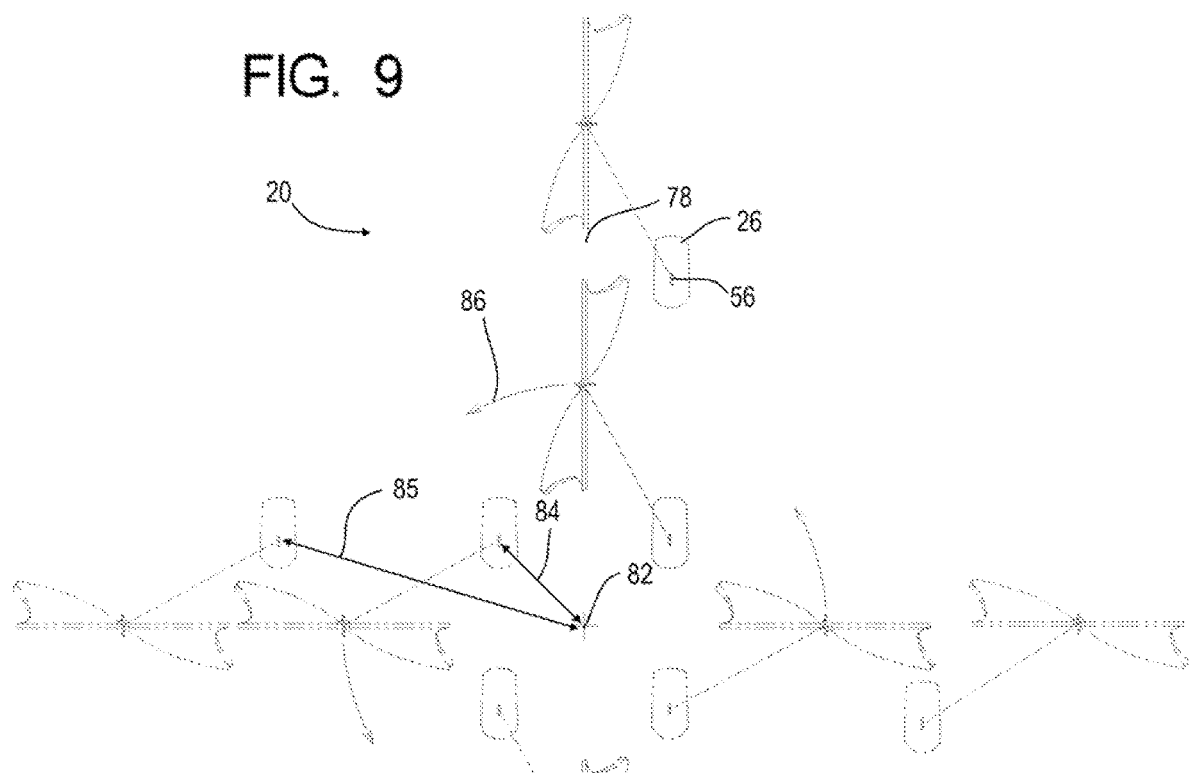
FIG. 9 is a cutaway view taken along line 9-9 of FIG. 8.

As can be appreciated by looking to FIGS. 8 and 9, the lure 26 attached to a flasher 20 in this configuration will also orbit about the orbit centerline 82 at an offset 84 or 85 therefrom in a generally circular pattern. In practice, many hydrodynamic variables interact with the flasher 20 and lure 26 and it has been found that in the configuration associated with the second flasher mode some rotation of the flasher 20 about the longitudinal centerline 40 may occur in combination with orbiting about the orbit centerline 82 along direction of orbit 86. Likewise, the lure 26 in many examples rotates about the eye 56 due to hydrodynamic forces upon the surfaces of the lure 26.

Fish are generally believed to be less likely to strike a target acting in a predictable manner. The hydrodynamic actions and forces acting on the example flasher 20 result in orbital and longitudinal somewhat random motion of the lure 26 which is more likely to appear non-mechanical and unpredictable and thus are more likely to cause a fish to bite or "strike" the lure 26 than the predictable or mechanical action provided by most lures 26 and rotating flashers 20. As with most predators, many fish are more likely to attack a sick or wounded target because the example flasher 20 causes the lure 26 to at least appear to move in a non-predictable or apparently random manner that more closely resembles a sick or wounded target desired by many fish.

In one example, the (convex) leading edges 88 and 90 as well as (convex) trailing edge (edges) 92, 94 are relatively large smooth curves relative to the longitudinal length and lateral width of the main body 42. It is generally believed that the smooth and even surfaces defined by the leading edges 88 and 90 and trailing edge or edges 92 and 94, at trolling speeds generally between 2-12 knots, do not cause air pockets or cavitation resulting in a relatively predictable motion. These sharper curves may contribute to more random action of the flasher 20 but, as they are smaller surfaces, the random action will be less pronounced than they would be on larger surfaces so curved or angled.

In addition, these curves combine to form the shape of a flasher 20 which is generally fish-like. In this example a surface defining a void 80 forming a hanging hole through the main body 42. where the eye of a fish would generally be to increase the likelihood that a fish will be attracted to the flasher 20. The hanging hole 80 as located further allow the carrying (stacking) of multiple flashers 20 even of varying sizes very easily such as by passing a carabiner, rope, wire, or other apparatus through the hanging holes 80 of a plurality of flashers 20 simultaneously hanging or carrying the combination of flashers. The hanging hole 80 in one example may be a surface defining a void having a diameter between ¼" to 1".

Figure 5:
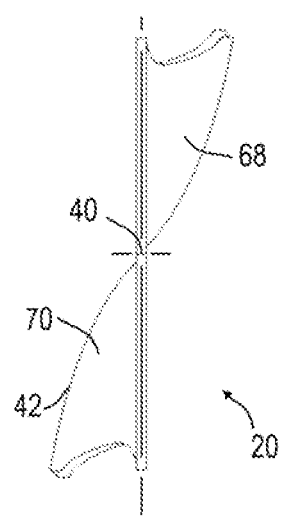
FIG. 5 is a front enlarged view of the apparatus shown in FIG. 1.
Figure 6:
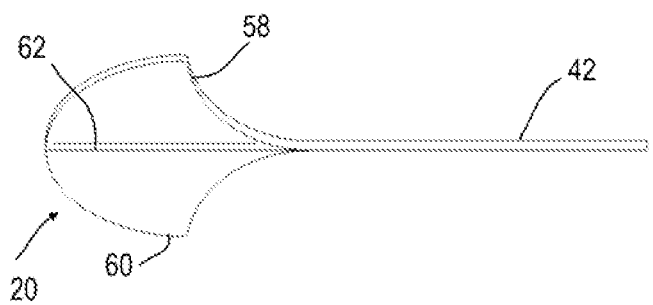
FIG. 6 is an isometric enlarged view of the apparatus shown in FIG. 1.

As can be appreciated by looking to FIG. 5, in this example the fishing flasher device 20 is substantially rotationally symmetric about the longitudinal axis. As the upper half of the apparatus is geometrically rotated about the longitudinal axis 40, the upper half is substantially identical to the lower half. Several aspects which may make the apparatus not fully rotationally symmetric include: the transverse sides 68 and 70 if they are not identical, such as having different reflective surfaces, the off-axis main line attachment 78, and an off-axis hanging hole 80.

In one example, the surfaces defining main line attachment 38, trailing line attachment 48, and off-axis main line attachment 78, each form surfaces defining voids having a diameter of ¹⁄₃₂" to W, and in a narrower range from ¹⁄₁₆" to ⅛".

The size of the fins, the angle of the fin fold angle, the lateral distance between the fin fold line and the longitudinal axis, trolling speed, as well as the fin axis angle; all play a part in the rotational/orbital speed of the fishing flasher device. In one example, the fishing flasher device is arranged wherein the fin fold angle is between 40 and 55 degrees. In a narrower range, the fishing flasher device is arranged wherein the fin fold angle is between 40 and 45 degrees.

To maximize rotational speed of the fishing flasher device, the example fishing flasher device may be arranged wherein the fin fold angles 66a and 66b are equal and may be selected based on or to complement the longitudinal length of the main body along the longitudinal axis. The following table sets forth certain examples of the fin fold angles 66a and 66b for several example main body lengths for one particular example shape of a fishing flasher device of the present invention:

| Main Body Length (approximate) | Fin Fold Angle (approximate) | First Fin Fold Angle Range | Second Fin Fold Angle Range |
| --- | --- | --- | --- |
| 8-5/8" (21.91 cm) | 44° | 39° to 49° | 34° to 54° |
| 7-3/4" (19.69 cm) | 41° | 36° to 46° | 31° to 51° |
| 6-5/16" (16.03 cm) | 40° | 35° to 45° | 30° to 50° |
| 5" (12.70 cm) | 55° | 50° to 60° | 45° to 65° |

Figure 10:
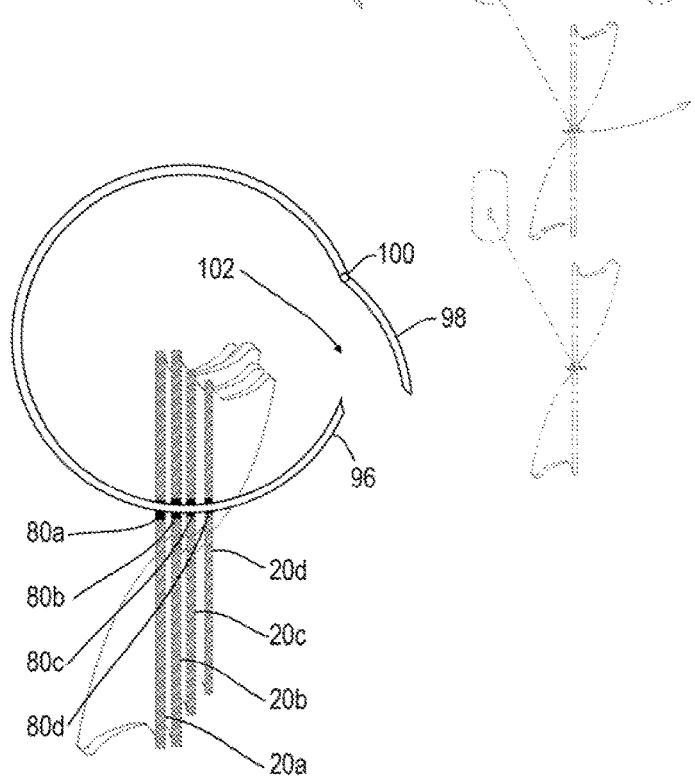
FIG. 10 is a cutaway view of a plurality of the apparatus shown in FIG. 1 attached to one example of a carrying device.

Looking to FIG. 10 is shown a plurality of flasher devices 20 (*a-d*) of varying sizes attached via voids 80 (*a-d*) by way of a carry device 96. In this configuration, the carry device 96 is a ring shaped apparatus having a gate 98 which rotates about a pivot 100 forming an open region 102. Such carrying devices are commonly known in the forms of carabiners, key rings, etc. Another example of a carry device 96 which would function in a similar manner is a length of rope, string, line, cable, etc. which can be tied or otherwise coupled to form and close the open region. Once the open region is formed, the flasher devices 20 may be attached by passing one end of the carry device 96 sequentially through the surfaces defining voids 80. In the example shown in FIG. 10, a large, first flasher device 20a having a surface defining a void 80a is attached to the carry device 96. Next a large, second flasher device 20b having a surface defining a void 80b is attached to the carry device 96. Next a smaller, third flasher device 20c having a surface defining a void 80c is attached to the carry device 96. Lastly a smallest, fourth flasher device 20d having a surface defining a void 80d is attached to the carry device 96. When the last flasher device 20 is attached to the carry device 96, the open region 102 is closed by fastening, tying, or a spring loaded gate 98 so as to secure the flasher devices 20 thereto.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

What is claimed is:

1. A fishing flasher device comprising:
   a substantially planar main body having opposing transverse sides;
   the main body having a forward end region and a rearward end region;
   an on-axis main line attachment at the forward end region of the main body on the longitudinal axis;
   a second main line attachment at the forward end region of the main body, offset from the on-axis main line attachment a first offset distance;
   a third main line attachment at the forward end region of the main body on the longitudinal axis, offset from the on-axis main line attachment a second distance greater than the first offset distance;
   a trailing line attachment at the rearward end of the main body; and
   at least one transverse side of the main body having a highly reflective surface thereon.

2. The fishing flasher device as recited in claim 1 further comprising a surface defining a hanging hole through the main body longitudinally rearward of the on-axis main line attachment.

3. The fishing flasher device as recited in claim 1 further comprising:
   a fin fold line in the plane of the main body at a fin axis angle to the longitudinal axis on each lateral side of the longitudinal axis;
   wherein the fin fold angle is between 40 and 55 degrees.

4. The fishing flasher device as recited in claim 1 further comprising:
   a fin fold line in the plane of the main body at a fin axis angle to the longitudinal axis on each lateral side of the longitudinal axis;
   wherein the fin fold angle is between 40 and 45 degrees.

5. The fishing flasher device as recited in claim 1 further comprising:
   a fin fold line in the plane of the main body at a fin axis angle to the longitudinal axis on each lateral side of the longitudinal axis;
   wherein the fin fold angle is commensurate with the longitudinal length of the main body along the longitudinal axis.

6. The fishing flasher device as recited in claim 5, wherein the longitudinal length of the main body is substantially 8⅝" and the fin fold angle is substantially 44 degrees.

7. The fishing flasher device as recited in claim 5, wherein the longitudinal length of the main body is substantially 7¾" and the fin fold angle is substantially 41 degrees.

8. The fishing flasher device as recited in claim 5, wherein the longitudinal length of the main body is substantially 6 5/16" and the fin fold angle is substantially 40 degrees.

9. The fishing flasher device as recited in claim 5, wherein the longitudinal length of the main body is substantially 5" and the fin fold angle is substantially 55 degrees.

10. The fishing flasher device as recited in claim 1 wherein each transverse side of the main body has a highly reflective surface thereon.

11. The fishing flasher device as recited in claim 1 having a forward end wherein:
    the second main line attachment at the forward end region of the main body, is longitudinally offset from the forward end of the main body a first longitudinal distance; and
    the third main line attachment at the forward end region of the main body on the longitudinal axis, is longitudinally offset from the forward end of the main body a second longitudinal distance greater than the first longitudinal distance.

12. The fishing flasher device as recited in claim 1 comprising:
    a fin fold line in the plane of the main body at a fin axis angle to the longitudinal axis on each lateral side of the longitudinal axis; and
    a plurality of fins each extending from the main body along the fin fold line at a fin fold angle such that each fin is not coplanar with the main body.

* * * * *